United States Patent
Li et al.

(10) Patent No.: US 6,504,583 B2
(45) Date of Patent: *Jan. 7, 2003

(54) ANTI-MICROBIAL TOUCH PANEL AND METHOD OF MAKING SAME USING HOMEOTROPIC LIQUID CRYSTAL SILANES

(75) Inventors: Chia-Yen Li, Andover, MA (US); Frank J. Bottari, Acton, MA (US); Bernard O. Geaghan, Salem, NH (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/233,305

(22) Filed: Jan. 19, 1999

(65) Prior Publication Data

US 2001/0013907 A1 Aug. 16, 2001

Related U.S. Application Data

(63) Continuation-in-part of application No. 09/165,404, filed on Oct. 2, 1998.

(51) Int. Cl.[7] .................. G02F 1/1335; G02F 1/1337; C09D 5/20
(52) U.S. Cl. .............. 349/12; 349/130; 106/2
(58) Field of Search ................ 349/130, 12; 252/49.6; 106/2; 508/206

(56) References Cited

U.S. PATENT DOCUMENTS

3,560,385 A    2/1971  Roth ................... 508/204

(List continued on next page.)

FOREIGN PATENT DOCUMENTS

| EP | 0 846 715 | 6/1998 |
| EP | 0 877 027 | 11/1998 |
| GB | 1386876 | 5/1972 |
| GB | 1433303 | 2/1974 |
| JP | 1-256544 | * 10/1989 |
| JP | 05266750 | 10/1993 |
| JP | 8-185560 | * 7/1996 |
| JP | 2001-11376 | * 1/2001 |

OTHER PUBLICATIONS

Uchida et al. "Surface Alignment of LIquid Crystal" Liquid Crystals Applications and Uses vol. 13, pp. 7–9 (1990).

Kahn et al. "Surface–Produced Alignment of Liquid Crystals" Proceedings of the IEEE–vol. 61–No. 7, pp. 823–828 (Jul. 1973).

Haller "Alignment and Wetting Properties of Nematic Liquids" Applied Physics Letters, vol. 24, No. 8, pp. 349–351 (Apr. 15, 1974).

*Primary Examiner*—William L. Sikes
*Assistant Examiner*—Dung Nguyen
(74) *Attorney, Agent, or Firm*—Robert J. Pechman (57) ABSTRACT

An anti-microbial touch panel includes a substrate; an active portion on one surface of the substrate; and a homeotropic organosilane layer deposited on the active portion for reducing survivability of microorganisms contacting the touch panel.

4 Claims, 4 Drawing Sheets

U.S. PATENT DOCUMENTS

| | | |
|---|---|---|
| 3,730,701 A | 5/1973 | Isquith et al. .................. 504/153 |
| 3,860,709 A | 1/1975 | Abbott et al. .................... 514/63 |
| 4,150,877 A * | 4/1979 | Kobale et al. ................. 350/341 |
| 4,288,357 A | 9/1981 | Kanazawa et al. ........... 260/31.2 |
| 4,422,732 A * | 12/1983 | Ditzik ............................ 350/356 |
| 4,527,862 A | 7/1985 | Arakawa ........................ 350/334 |
| 4,678,283 A * | 7/1987 | Kreuzer et al. ................ 350/340 |
| 4,866,192 A | 9/1989 | Plueddemann et al. ....... 556/410 |
| 4,911,536 A * | 3/1990 | Ditzik ............................ 350/351 |
| 5,115,487 A * | 5/1992 | Blyler, Jr. et al. ............. 385/128 |
| 5,266,222 A * | 11/1993 | Willis et al. ............... 252/49.006 |
| 5,335,373 A * | 8/1994 | Dangman et al. ................. 2/167 |
| 5,411,585 A | 5/1995 | Avery et al. |
| 5,831,700 A * | 11/1998 | Li et al. ............................ 349/88 |

\* cited by examiner

ANTI-MICROBIAL TOUCH PANEL AND METHOD OF MAKING SAME USING HOMEOTROPIC LIQUID CRYSTAL SILANES

RELATED INVENTIONS

This is a continuation-in-part of U.S. patent application Ser. No. 09/165,404 entitled "SCRATCH RESISTANT DISPLAY AND METHOD OF MAKING SAME USING HOMEOTROPIC LIQUID CRYSTAL SILANES" filed Oct. 2, 1998.

FIELD OF INVENTION

This invention relates to scratch resistant, anti-microbial surfaces, and more particularly to an anti-microbial, scratch resistant computer touch panel.

BACKGROUND OF INVENTION

Surface scratches affect product appearance and function in detrimental ways. This is especially true in the optics and display industry where the display surface is coated with a layer or layers intended to provide a specific function such as a filter or dielectric coating. In particular, computer touch screen panels are especially vulnerable. Touch panels have become more and more popular as input devices for computers. A touch is sensed by a touch panel when a finger or a stylus comes into contact with the outermost surface of the touch panel. The contact is translated into x and y coordinates of the finger or stylus on the panel. Some touch panels are transparent overlays placed over a display. Other touch panels are non-transparent devices typically used to control cursor movement for example on a portable computer, or as pen input devices for applications including writing or signature input to a computer. Since the data entry is based on contact, touch panels are inherently susceptible to scratches and to microbial contamination.

A scratch is made by a plastic deformation on a surface. The force that produces a scratch can be divided into two components: a component that is perpendicular to the surface and another component parallel to the surface. The component perpendicular to the surface produces a plastic deformation on the surface and the component parallel to the surface extends the damage by plowing material out of the way. The damage due to the perpendicular component is dependent upon the friction of the contact surfaces. The higher the friction coefficient, the larger the perpendicular component and thus the more damage which results.

Two of the most widely employed approaches for providing scratch resistance to a surface are the introduction of lubricants and solid/hard protective coatings applied to the outer most layer of the touch panel. The introduction of a lubricant reduces the energy dissipation along the surface attributable to the vertical component which would otherwise cause damage to the surface. Solid/hard coatings are intended to avoid the initial plastic deformation in the first place. Neither lubricants nor solid/hard protective coatings, however, provide sufficient scratch resistance to touch panels.

Non-homeotropic organosilanes have long been used as coupling agents which provide a stable bond between dissimilar surfaces. It is an important characteristic of coupling agents that they form a chemical bond to surface materials. Most of the anti-scratch surface treatments involve providing hard coatings although some use organosilanes to improve lubricity of glass surfaces.

Several other families of organosilanes have been tested. These include alkylsiloxanes, alkylaminosiloxanes, perfluoroalkylsiloxanes. None of these organosilanes, however, have been found to improve scratch resistance to the extent required for touch panels.

Touch panels can be found in applications from ATM's to casinos to point of sale terminals and portable computers. These environments are extremely harsh and susceptible to scratching from coins, bottles and glasses as well as being exposed to harsh outdoor elements where they are subject to airborne debris and even vandalism. Depending on the severity of the scratch, the function of the display may be greatly affected.

Moreover, these touch panels are subject to microbial colonization and damage. Forgetting for the moment the affects of scratches on the touch panel, these panels provide a suitable home for bacteria, fungi, algae, and other one celled organisms which thrive and propagate based on the availability of appropriate amounts of moisture, temperature, nutrients, and receptive surfaces. As these organisms metabolize, they produce chemical by-products. These chemicals are known to etch the touch of sensitive panels, producing odors. Further, the biomass of such colonies fog or obscure the optical properties of the panels, irreparably damaging the touch panel. Cleaning and disinfection with chemicals which leach and poison the organisms and environmental controls which minimize moisture have, to date, been the response to this problem. Although cleaning and disinfection is common practice, it is done with the knowledge of the risks of sub-lethal dose levels, ineffective doses, resistant organisms, environmental exposure, human exposure, and the limited duration of such cleaners after the initial treatment. Indeed, scratches which do not destroy the panel itself may provide a safe haven for the bacteria despite attempts to wipe the panel to remove such microorganisms.

Moreover, typical touch screen panels, e.g., capacitive touch screen panels, require direct contact with the skin of the user's finger. Thus, these panels are directly contacted by many different users. As these organisms thrive, the variety of chemicals that these organisms produce are also known affect the human user. Thus, these microorganisms, as well as their metabolic products can pose serious health risks to users ranging from minor skin irritation to more serious toxic response and disease. With the increased popularity of such touch panels, the public is becoming increasingly aware of and concerned with the presence of microorganisms on these panels and the potential consequences resulting from contact with such contaminated surfaces.

The foregoing concerns demonstrate growing detrimental affects of microorganisms to computer touch panels and a need for controlling microorganisms on such touch sensitive panels. The use of environmental controls has limited effectiveness on microorganism prevention in part because of the wide variety of environmental conditions under which various microorganisms can survive and in part because of the costs and difficulty of actually keeping moisture levels sufficiently low enough to minimize microbial growth.

SUMMARY OF INVENTION

It is therefore an object of this invention to provide a touch panel which is resistant to scratches and microorganisms.

It is a further object of this invention to provide such an anti-microbial, scratch resistant touch panel which is durable and long lasting.

It is a further object of this invention to provide such an anti-microbial, scratch resistant touch panel which is simpler to produce and more durable than current methods.

It is a further object of this invention to provide an anti-microbial, scratch resistant coating which can be applied to most any touch panel surface.

The invention results from the realization that a truly durable and long lasting scratch resistant and anti-microbial touch panel can be obtained by applying a homeotropic organosilane to the outer most surface of the touch panel that chemically bonds to the surface and reduces energy dissipation of an object as the object is dragged transverse to the surface and inhibits the survivability of microorganisms which contact the touch panel.

This invention features an anti-microbial touch panel including a substrate, an active portion on one surface of the substrate and a homeotropic organosilane layer deposited on the active portion for reducing the survivability of microorganisms contacting the touch panel.

In a preferred embodiment the active portion may include a conductive layer. The active portion may include a protective layer. The protective layer may be an organosiloxane. The active portion may include a deformable conductive layer disposed on the conductive layer. The organosilane may be a liquid crystal silane. The substrate may be transparent. The transparent substrate may be glass and the touch panel may be a computer touch screen. The first conductive layer may be metal oxide. There may be a second conductive layer disposed on the substrate on a surface opposite the active portion. The first and second conductive layers may be tin oxide.

The invention also features an anti-microbial touch panel having an insulative substrate, a conductive layer disposed on one surface of the insulative substrate, and a homeotropic organosilane layer disposed on the conductive layer for reducing survivability of microorganisms contacting the touch panel.

The invention also feature an anti-microbial touch panel having an insulative substrate, a conductive layer disposed on one surface of the insulative substrate, a deformable conductive layer disposed on the conductive layer and a homeotropic organosilane layer disposed on the deformable conductive layer for reducing survivability of microorganisms contacting the touch panel.

The invention also features an anti-microbial touch panel having an insulative substrate, an active portion disposed on the substrate, the active portion having at least a first conductive layer disposed adjacent the insulative substrate, a deformable conductive layer adjacent and spaced from the first conductive layer, a protective layer disposed on the deformable conductive layer, and a homeotropic organosilane layer disposed on the active portion for reducing survivability of microorganism contacting the touch panel.

The invention also features a method for producing an anti-microbial touch panel by combining a transportation medium and a homeotropic organosilane and applying the combination to the touch panel.

In a preferred embodiment the touch panel may be a transparent touch panel. The method may include chemically activating a surface of the touch panel with an organosilane primer prior to applying the homeotropic organosilane. The organosilane may be a liquid crystal silane. The method may include heating the touch panel, after applying the combination, to a temperature below the dissociation temperature of the combination. The transportation medium may include water or alcohol.

DISCLOSURE OF PREFERRED EMBODIMENT

Other objects, features and advantages will occur to those skilled in the art from the following description of a preferred embodiment and the accompanying drawings, in which.

Figure 1:
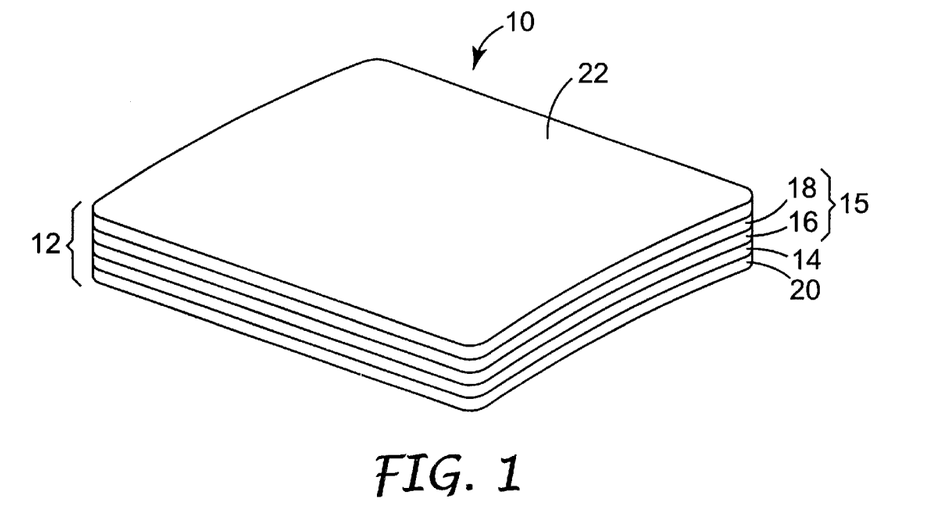
FIG. 1 is a three dimensional view of the scratch resistant, anti-microbial touch panel according to the present invention in which the touch panel is a capacitive touch screen panel.

Scratch resistant, anti-microbial display 10, FIG. 1 according to the present invention may be a touch sensitive panel such as, for example, a computer touch panel, available from Microtouch Systems, Inc., Methuen, Mass. made up of several different layers.

Touch panel 12 typically includes insulative substrate 14, such as glass, plastic or another transparent medium and active portion 15 on substrate 14. Active portion 15 typically includes transparent conductive layer 16 deposited directly on substrate 14. Layer 16 is typically a tin oxide layer having a thickness of twenty to sixty nanometers and may be deposited by sputtering, vacuum deposition and other techniques known in the art. The thickness of the layers is exaggerated in the figure for illustrative purposes only and is not intended to represent the layers to scale. Conductive layer 16 may also include a conductive polymeric material or a conductive organic-inorganic composite.

A conductive pattern, not shown, is typically disposed about the perimeter of conductive layer 16 to provide a uniform electric field throughout conductive layer 16 in order to establish the point of contact between the display and a finger or stylus.

Active portion 15 may also include protective layer 18 deposited over conductive layer 16 to provide abrasion resistance to protect conductive layer 16. Protective layer 18 may be a layer of an organosiloxane formed by applying to the article a solution comprising methyltriethoxysilane, tetraethylorthosilicate, isopropanol and water.

Second conductive layer 20 may be provided to shield display 10 from noise which may result from the electric circuits of a display unit, not shown, to which display 10 may be attached and may similarly include a tin oxide layer deposited in a similar manner as discussed with reference to conductive layer 16. However, conductive layer 20 is not a necessary limitation of the invention as display 10 can function without it.

Anti-microbial and scratch resistant layer 22 in accordance with this invention is applied to active portion 15, usually on protective layer 18 or even directly to conductive layer 16 if protective layer 18 is not present or to the outermost layer if additional layers are present to reduce energy dissipation of an object contacting display 10, thereby minimizing or preventing damage to display 10 as well as inhibit the survival and growth of microorganisms which come to rest on display 10. Anti-microbial and scratch resistant layer 22 preferably includes a homeotropic liquid crystal silane compound.

Figure 2:
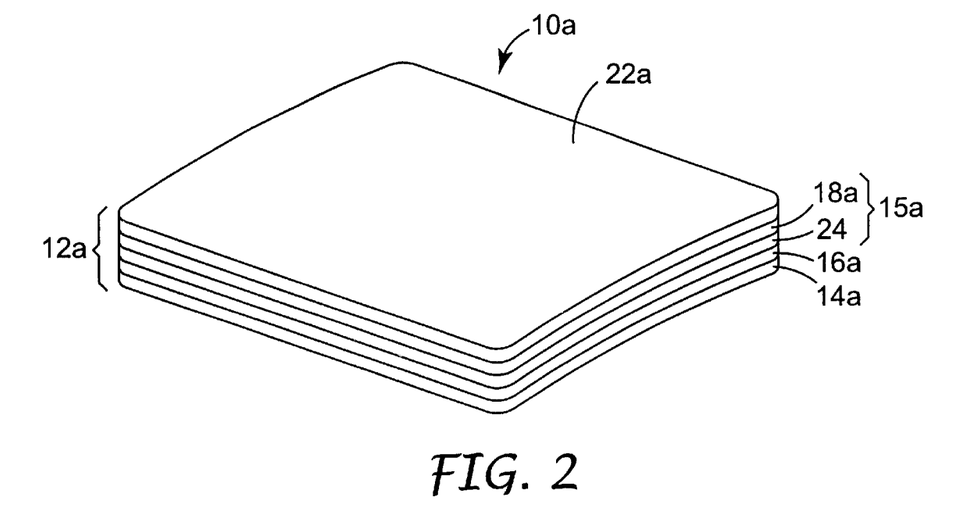
FIG. 2 is a three dimensional view, similar to FIG. 1, in which the touch panel is a resistive touch screen panel.

Display 10a, FIG. 2, may include, for example, a resistive computer touch panel 12a available from Microtouch Systems, Inc., Methuen, Mass., Elo TouchSystems, Freemont, Calif., or Dynapro, Vancouver, British Columbia, which includes insulative substrate 14a and conductive layer 16a, similar to FIG. 1. Protective layer 18a may include a hard coating which protects and supports deformable conductive layer 24 interposed between conductive layer 16a and protective layer 18a. As display 10a is contacted by a finger or stylus deformable conductive layer 24 compresses and makes contact with conductive layer 16a to indicate the position of the contract. Anti-microbial layer 22a is applied to layer 18a and also preferably includes a homeotropic liquid crystal silane compound. However, this is not a necessary limitation of the invention as some layers may not be required.

Liquid crystal silanes are in the family of organosilanes. The general formula for an organosilane is $$R_n SiX_m$$

where R=organofunctional group bounded to the silicon atom;

X=hydrolyzable groups, such as a halogen or an alkoxy group, attached to the silicon atom;

n=1 or 2; and m=4−n.

However, liquid crystal silanes have the general formula:

$$X_3Si(CH_2)_p Z$$

where p>1;

X=is selected from the group Cl, Br, alkoxy, hydroxyl radicals, and mixtures thereof, which are hydrolyzable to form a silanol; and Z=a compound selected from the group alkyl quaternary ammonium salts, alkyl sulfonium salts, alkyl phosphonium salts, substituted biphenyl compounds, terphenyl compounds, azoxybezenes, cinnamates, pyridines, benzoates, and mixtures thereof.

Liquid crystal silanes form durable and long lasting bonds to surfaces such as glass, plastic, ceramic, semiconductors, metal, organic polymer coated substrates or inorganic coated substrates. These silanes have a molecular structure which is highly ordered. Homeotropic liquid crystal silanes, in addition to being highly ordered, bond such that the major axes of the carbon chains which make up the liquid crystal silanes spontaneously align or tend to align oriented perpendicular to the surface to which they are bonding. Because the alignment is perpendicular, the resultant film has a higher packing density, maximizing Van der Waal forces and thus effectively preventing scratches. Moreover, because the chains are perpendicular, the one celled microbes are impaled on the chain, thus, the microbes are destroyed.

A good example of a liquid crystal silane having such properties is Dow Corning 5700, available from Dow Corning, Midland, Mich., which contains eight (8) weight percent chloropropyl trimethoxysilane, forty-two (42) weight percent octadecylaminodimethyl trimethoxysilylpropyl ammonium chloride, and fifty (50) weight percent methyl alcohol.

Another liquid crystal silane is Dow Corning 5772 which contains fifteen (15) weight percent chloropropyl trimethoxysilane, seventy two (72) weight percent octadecylaminodimethyl trimethoxysilylpropyl ammonium chloride, one (1) weight percent diethyl octadecylamine and twelve (12) weight percent methyl alcohol.

A similar liquid crystal silane to Dow Corning 5700 is Gelest SIO6620.0, available from Gelest, Inc., Tullytown, Pa., which contains sixty (60) weight percent octadecylaminodimethyl trimethoxysilylpropyl ammonium chloride, three (3) to five (5) weight percent $Cl(CH_2)_3Si(OMe)_3$, and thirty five (35) to thirty seven (37) weight percent methanol.

A transportation medium is typically used to dilute the homeotropic liquid crystal silane as well as to transport the silane to the surface to be protected. Small molecule alcohols such as methanol, ethanol, and isopropanol are the preferred vehicle for silane applications, however, water may also be used as a transportation medium. Additionally, water reacts with organosilanes to form hydrolyzed products or silanols.

It is also known that hydrolysis reactions between water and organosilanes can be catalyzed in an acidic solution. Thus, a stabilizing agent may be used so that the silanols are stable against self-condensation reactions which may cause precipitation of the solution if the solution is basic.

The bond formed between the silanol and the substrate is accomplished through a cross condensation reaction. The cross condensation reaction between a silanol and a molecule on the substrate is generally slow. This reaction can be accelerated by heating the freshly treated substrate at temperatures up to 150° C. for several minutes, typically at least three (3) minutes. However, if the temperature exceeds 150° C. the silane dissociates with the transportation medium. Typically, heating the substrate to between 100 and 150° C., below the dissociation temperature, for at least three (3) minutes is sufficient to form permanent bonds between the liquid crystal silane and the substrate.

An organosilane primer layer may be used to enhance the bonding between the substrate and the liquid crystal silane. Generally, an organosilane layer contains a very high concentration of hydroxyl groups and high angle Si—O—Si bonds. These are the bonding sites for the hydrolyzed liquid crystal silane. Permanent bonding is formed by condensation reactions between the hydrolyzed liquid crystal silane molecules and the organosilane layer. The Si—O—Si bonds are known to be extremely durable. The best bonding can be obtained by applying the liquid crystal silane to a freshly deposited organosilane primer layer.

As stated above in the Background of Invention, a scratch is formed when a plastic deformation occurs and material is plowed away. As the object such as a finger, stylus, bottle coin or other hard object moves across the surface, energy is dissipated as the result of frictional forces between the contacting surfaces. Thus, if energy dissipation is reduced, there is no plowing and thus no scratching.

Figure 3A:
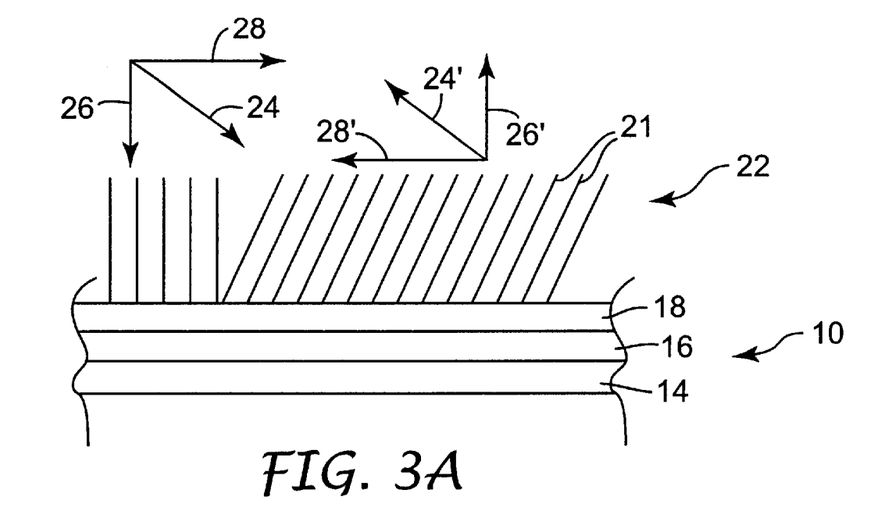
FIG. 3A is a representation of the scratch resistant, anti-microbial touch panel according to this invention demonstrating how the individual carbon chains of the liquid crystal silanes align and are oriented perpendicular to the touch panel and how the liquid crystal silane reacts to an object contacting the touch panel.

The force of an object contacting display 10, FIG. 3A, is represented by arrow 24 which may be broken down into vertical component 26 and horizontal component 28.

However, liquid crystal silane 22 is made up of individual carbon chains 21, shown greatly enlarged, which align or tend to align perpendicular to protective layer 18. As chains 21 are bent due to contact by an object in a direction corresponding to the direction of arrow 24, the force of the contact is met with an opposing force represented by arrow 24' which can be broken down into components 26' and 28', which oppose vertical and horizontal force components 26 and 28, respectively. Due to the higher packing density, an object is met with an even greater opposing force.

Figure 3B:
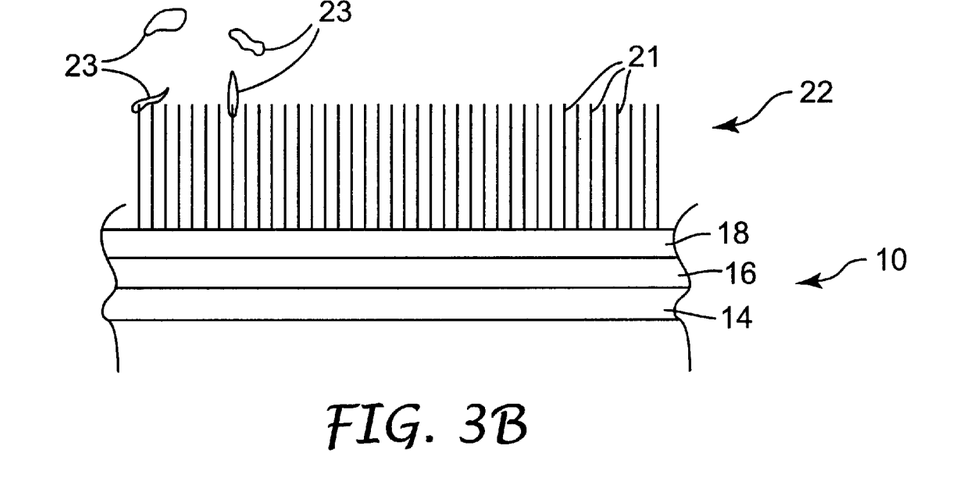
FIG. 3B is a representation, similar to FIG. 3A, demonstrating how microorganisms are impaled on the carbon chains.

As microorganisms 23, FIG. 3B, impact or are deposited on layer 22, the cells are impaled on chains 21 and thus destroyed, preventing colonization of the microorganisms and production of detrimental chemicals thereby preventing spread of disease and degradation of the touch panel. The perpendicular orientation of chain 21 and the high packing density cause organisms 23, for example a one celled microorganism such as bacteria, algae or fungus, to become impaled on the chain as it impacts the layer irrespective of the orientation of the organism as it contacts layer 22, destroying the organism.

The higher packing density of liquid crystal silanes is due to their highly ordered structure. Linear carbon chains of homeotropic organosilanes are tightly packed perpendicularly to the surface thereby providing greater opposing forces than normal lubricants to counter damaging forces. This highly ordered structure presents less structural defects, such as deformation of extended chain structures, and therefore provides better scratch resistance than normal lubricants. Homeotropic liquid crystal silanes maximize the thickness of the protective layer because their axis is perpendicular to the surface.

In contrast, non-homeotropic liquid crystal silanes cannot form this highly ordered layer and thus provide much less protection to the surface from scratches, and permit survival and reproduction microorganisms which do not become impaled.

Thus, because the force the object is opposed by the liquid crystal silane as a result of the homeotropic orientation of the silane, less frictional contact takes place and thus less energy dissipation occurs thereby minimizing damage which may otherwise result from the contact of a finger, stylus or other hard object on the display.

Treated articles not only showed an increase microbe and scratch resistance, but have further shown improved anti-static properties and easier cleaning:

EXAMPLE 1

Figure 4:
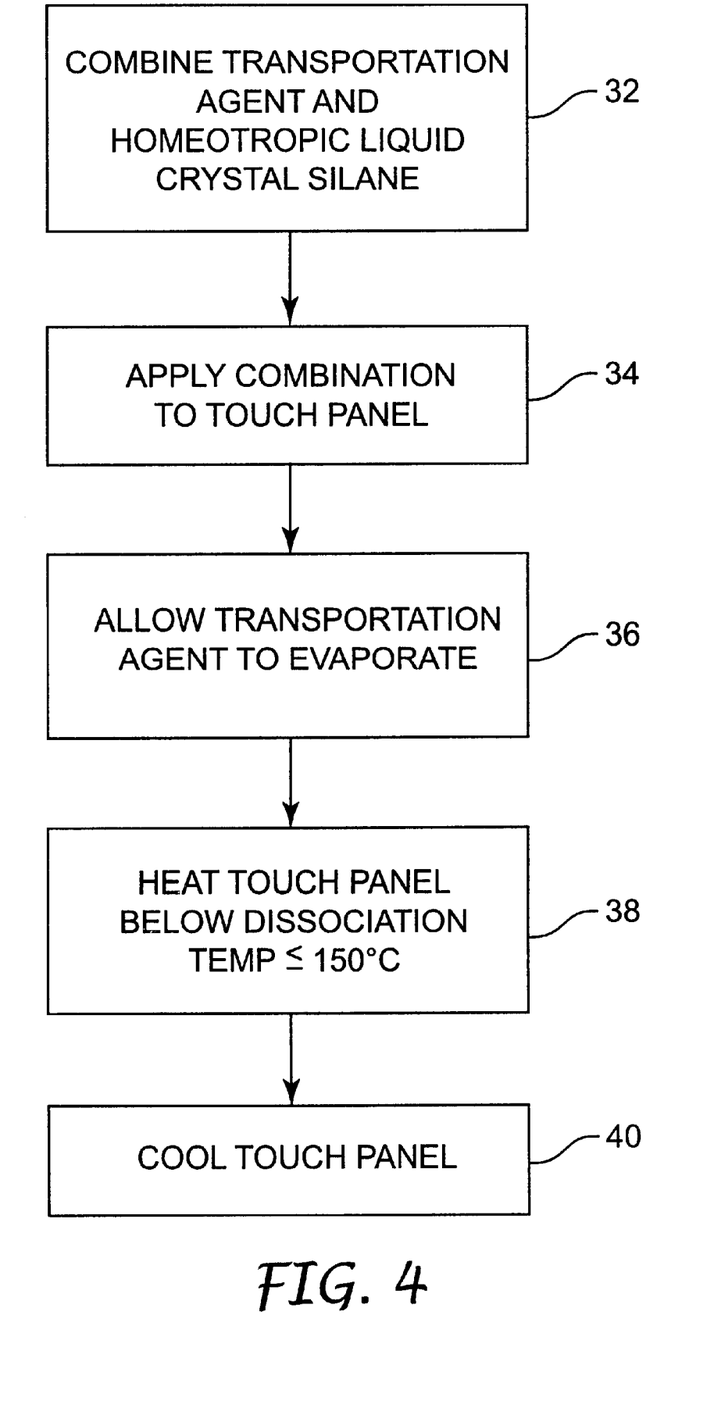
FIG. 4 is a block diagram of the method of providing a scratch resistant and anti-microbial touch panel according to the present invention.

An amount of one (1) weight percent water, as a hydrolyzing agent and transportation agent was combined with ninety seven point nine (97.9) weight percent isopropyl alcohol, also as a transportation agent, and one point one (1.1) weight percent Dow Corning 5700, Step 32, FIG. 4. The water was first added to the alcohol and mixed by mechanical stirring to obtain a homogeneous, clear solution. The Dow Corning 5700 compound was then added to this solution by mechanical stirring and stirred to obtain a homogeneous solution. The hydrolysis reaction took place instantaneously.

The combination was applied to the outer most surface of three sample capacitive touch screen panels, Step 34, obtained from Microtouch Systems, Inc., similar to display 12, FIG. 1, by spraying the solution onto the panel and wiping to uniformly distribute the solution. However, this is not a necessary limitation of the invention as the solution may be applied in any number of methods such as brushing, dipping, wiping, and other methods known in the art. The transportation medium was allowed to evaporate, Step 36, and the touch panel was subsequently heated to a temperature of 120° C. for a period of three (3) minutes, Step 38. Heating cures the film and facilitates bonding between the protective layer and the liquid crystal silane layer. The touch panel was then cooled, Step 40.

The anti-microbial function of the present invention is evident from the experiments carried out with model bacteria, Gram – and Gram +, and common fungi. Historic data indicate that if the treatment is effective against these model microorganisms, the treated surfaces will be effective against the full array of one celled organisms commonly referred to as microorganisms.

A comparison piece of untreated plain window glass was used as a control. A mixed culture of *Staphylococcus aureus* (Gram+Bacteria) and *Klebsiella pneumonia* Gram–bacteria) at a condition of $10^5$ /ml of sterile phosphate buffer was applied to three 1.5 $cm^2$ area and pressed to the surface with a microscope slide cover slip. The glass was allowed to set in a 37° C. incubator for one, two, and four hour intervals. After the appropriate incubation period, each sample was flushed with 50 ml of sterile buffer and the buffer solution was then checked for relative levels of bacterial growth using standard swab techniques. A sterile swab was placed into the buffer wash and streaked onto tryptic soy agar. The agar plates were then incubated for 24 and 48 hour intervals and inspected for intensity of growth. The scale of growth was as follows.

| GROWTH RATING SCALE | RANGE OF COLONY FORMING UNIT |
|---|---|
| NG (No Growth) | 0 |
| VL (Very Light) | 1 to 5 |
| L (Light) | 6 to 20 |
| M (Medium) | 21 to 50 |
| H (Heavy) | 51 to 150 |
| VH (Very Heavy) | Confluent |

The results of this testing showed very heavy growth on all the untreated surfaces.

In contrast, the treated surfaces showed very light growth after one hour of contact. This equates to a four plus log reduction of the test bacteria. Similarly, at the two hour period one sample showed no growth while the other two showed very light growth. This equates to a four to five log reduction. Finally, the four hour period resulted in two samples having no growth and one only very light growth. This also equates to a four to five log reduction.

Thus, where there exists a threat from microorganisms to touch sensitive panels, the present invention effectively and significantly reduces the threat.

The capacitive touch panels also proved very scratch resistant. A Balance Beam Scrape Adhesion Mar Tester, Model PA-2197, available from Paul N. Gardner Co., Inc., was used to measure scratch resistance of the touch screen panel prior to and after treatment.

The tester exceeds requirements of ASTM D-2197 standard test methods for adhesion of organic coatings by scrape adhesion and meets ASTM D-5178 standard test methods for mar resistance of organic coatings. The tester measures the amount of weight necessary to make a scratch by a stylus. A loop stylus, produced from $\frac{1}{16}$ inch steel having an outside diameter of 0.128 inches and heat treated to a hardness of 55–61 Rockwell, was used to make a scratch.

A scratch is defined by a functional failure of the protective layer 18, FIG. 1. In other words, protective layer 18 was removed to expose conductive layer 16.

Prior to treatment, a scratch was made by a load of only 50 grams. However, after treatment, the tester could not make a scratch at the maximum load of 10,500 grams. This is an improvement in scratch resistance of at least 210 times.

EXAMPLE 2

Figure 5:
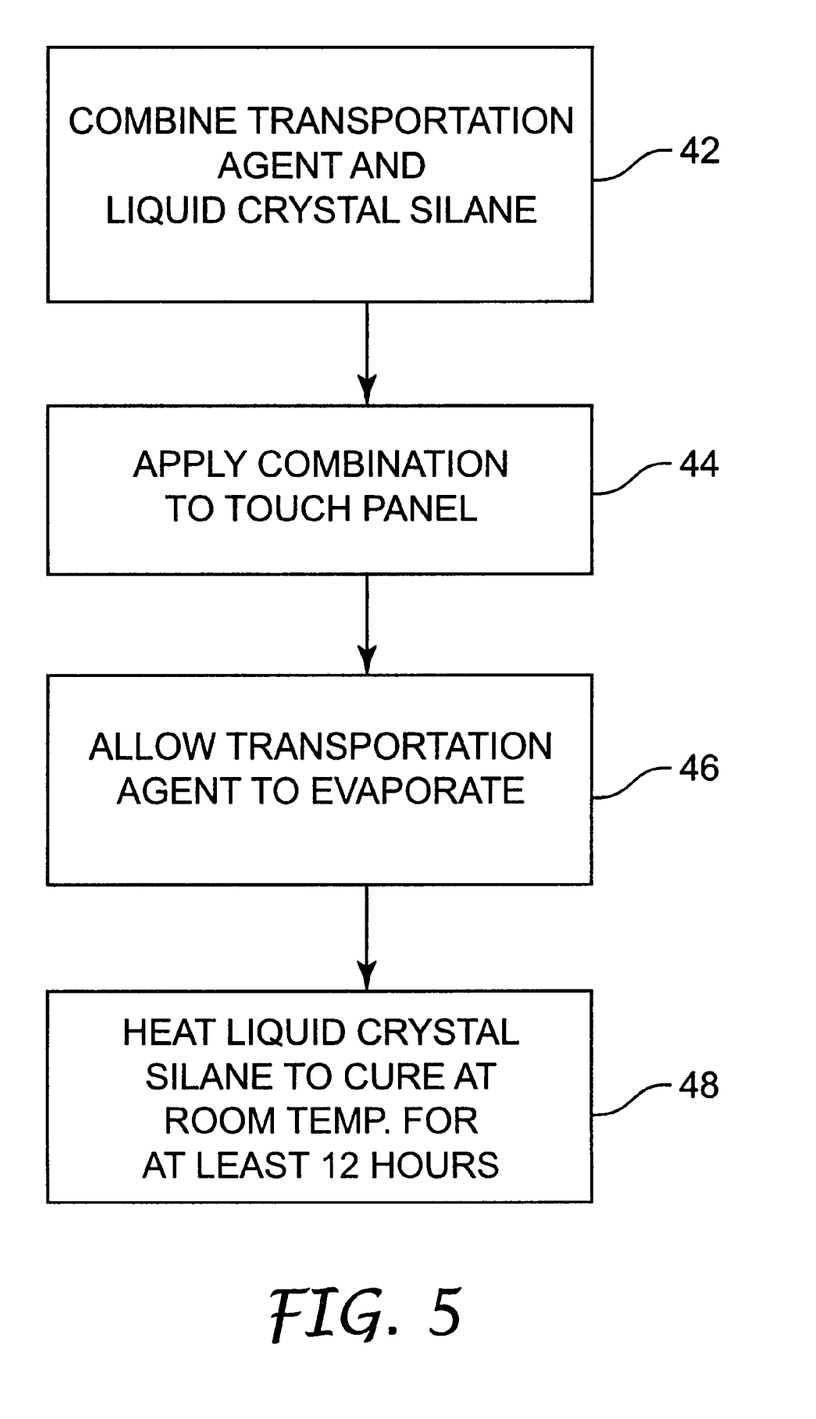
FIG. 5 is a block diagram, similar to FIG. 4, in which the liquid crystal silane is cured without heat.

An amount of one (1) weight percent water was combined with ninety eight (98) weight percent isopropyl alcohol and one (1) weight percent Gelest SIO6620.0, Step 42, FIG. 5, in the manner as discussed in EXAMPLE 1.

The combination was applied to a resistive touch panel, Step 44, obtained from Microtouch Systems, Inc., similar to touch panel 12a, FIG. 2, by spraying the solution onto the touch panel and wiping to uniformly distribute the solution. The transportation medium was allowed to evaporate, Step 46, and the film was left to cure at room temperature for approximately seventy two (72) hours, Step 48.

The same tester as discussed above was used to evaluate the scratch resistance characteristics of the touch screen panel. A scratch was defined as the delamination of protective layer 18a.

Prior to treatment, a scratch was produced with a load of only 250 grams.

However, after treatment, a load of 6,000 grams was required to make a scratch. This is an improvement in scratch resistance of up to 24 times.

EXAMPLE 3

An amount of one (1) weight percent water was combined with ninety eight (98) weight percent isopropyl alcohol and one (1) weight percent Dow Corning 5772, Step 42, FIG. 5, in the manner as discussed in EXAMPLE 1.

The solution was applied to a capacitive touch panel, Step 44, similar to touch panel 12, FIG. 1, obtained from Microtouch Systems, Inc. is a manner similar to that in EXAMPLE 2, that is, after evaporation of the transportation medium, Step 46, no heat was applied to the touch panel and the film was allowed to cure overnight, Step 48.

Scratch testing was done by using a Micro Scratch Tester, available from CSEM Instruments. The test involved generating a controlled scratch with a hard tip on the touch panel. A tungsten carbide indenter having a radius of 10 microns was drawn across the panel surface under a progressive load. The critical loads are detected very precisely by means of an acoustic sensor attached to the load arm and by optical microscopy.

The critical load to make a scratch prior to treatment of the touch panel was 0.55N. However, after treatment, the load required to make a scratch was 1.8N.

The popularity of touch panels has caused them to appear in a variety of locations subject to a variety of environments. Apart from the inherent threats of scratching through normal, traditional use, they are now further subject to non-traditional hazards such as scratches from bottles, coins and airborne debris as well as vandalism. Moreover, the increase in their use finds them in a variety of locations used by many people, increasing the potential threat of damage and disease transmission from microorganisms living on the touch panels. Through the application of a homeotropic liquid crystal silane to the outer most surface, the damage which would normally occur in these harsh environments, in addition to inherent damage caused by use, is dramatically reduced and often even prevented completely. Moreover, the damage due to microorganisms and the potential threat to users from these microorganisms are dramatically reduced. Prior lubricants and hard coatings, while somewhat effective, cannot provide the scratch resistance nor the anti-microbial properties that the present invention demonstrates.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of applying an anti-microbial coating to a touch screen, the method comprising:

depositing a siloxane material in a layer on the touchscreen to protect the touchscreen;

activating the siloxane material; and applying a homeotropic organosilane compound to the siloxane layer so that a chemical bond is formed between the siloxane layer and the homeotropic organosilane compound and a permanently applied anti-microbial coating is present on the touch screen.

2. The method of claim 1 in which activating includes raising the temperature of the touchscreen.

3. The method of claim 1 in which the siloxane material includes an organosiloxane compound.

4. A anti-microbial touch screen comprising:

a substrate;

an active area on the substrate;

a siloxane protective layer on the active area of the substrate; and a homeotropic organosilane anti-microbial layer chemically bonded to the siloxane protective layer.

* * * * *